(12) United States Patent
Ehlen et al.

(10) Patent No.: US 7,177,815 B2
(45) Date of Patent: *Feb. 13, 2007

(54) SYSTEM AND METHOD OF CONTEXT-SENSITIVE HELP FOR MULTI-MODAL DIALOG SYSTEMS

(75) Inventors: Patrick Ehlen, New York, NY (US); Helen Hastie, Florham Park, NJ (US); Michael Johnston, Hoboken, NJ (US)

(73) Assignee: AT&T Corp., New York, NY (US)

( * ) Notice: Subject to any disclaimer, the term of this patent is extended or adjusted under 35 U.S.C. 154(b) by 860 days.

This patent is subject to a terminal disclaimer.

(21) Appl. No.: 10/325,296

(22) Filed: Dec. 19, 2002

(65) Prior Publication Data

US 2004/0006475 A1    Jan. 8, 2004

Related U.S. Application Data

(60) Provisional application No. 60/394,336, filed on Jul. 5, 2002.

(51) Int. Cl.
*G10L 11/00* (2006.01)
*G10L 21/00* (2006.01)

(52) U.S. Cl. .................................. 704/270.1
(58) Field of Classification Search ........... 704/270.1
See application file for complete search history.

(56) References Cited

U.S. PATENT DOCUMENTS 5,855,000 A * 12/1998 Waibel et al. .............. 704/235
6,324,511 B1 * 11/2001 Kiraly et al. ............... 704/260
6,490,560 B1 * 12/2002 Ramaswamy et al. ...... 704/250
6,601,055 B1 * 7/2003 Roberts ...................... 706/45
6,633,846 B1 * 10/2003 Bennett et al. ............. 704/257
6,779,060 B1 * 8/2004 Azvine et al. .............. 710/65
6,829,603 B1 * 12/2004 Chai et al. .................. 707/5
7,058,888 B1 * 6/2006 Gjerstad et al. ............ 715/531
2002/0135618 A1 * 9/2002 Maes et al. ................. 345/767
2003/0046401 A1 * 3/2003 Abbott et al. .............. 709/228
2003/0093419 A1 * 5/2003 Bangalore et al. .......... 707/3
2003/0130854 A1 * 7/2003 Galanes et al. ............ 704/277
2004/0006480 A1 * 1/2004 Ehlen et al. ................ 704/276

* cited by examiner

Primary Examiner—Tālivaldis Ivars Šmits
Assistant Examiner—Eunice Ng (57) ABSTRACT

A method of presenting a multi-modal help dialog move to a user in a multi-modal dialog system is disclosed. The method comprises presenting an audio portion of the multi-modal help dialog move that explains available ways of user inquiry and presenting a corresponding graphical action performed on a user interface associated with the audio portion. The multi-modal help dialog move is context-sensitive and uses current display information and dialog contextual information to present a multi-modal help move that is currently related to the user. A user request or a problematic dialog detection module may trigger the multi-modal help move.

21 Claims, 8 Drawing Sheets

| QUERY HDM | Example | HELP ACTION | Example |
|---|---|---|---|
| QUERY HELP | I can help you find a restaurant, get subway directions or move around the map. Which one would you like to know about: restaurants, subway or map? | TRIAGE BUTTONS | |
| INZONE QUERY | I can help you find a restaurant in this area, get subway directions or move around the map. | TRIAGE BUTTONS | |
| INFOREQ QUERY | I can help you get information about a restaurant, get subway directions to one or move around the map. | TRIAGE BUTTONS | |
| EXEMPLARY HDM | Example | HELP ACTION | Example |
| SHOW RESTAURANT | You can find restaurants based on price, food type and location. For example, you could say, show inexpensive italian restaurants in Chelsea. Alternatively, you could circle an area you are interested in, like this, and write italian and cheap. | SELECT AREA WRITE REST | circle restaurant cheap italian |
| INZONE RESTAURANT | I can give you information on restaurants in this area based their price and food type. For example, you could say, show expensive French restaurants. Alternatively, you could write expensive and French on the map. | WRITE REST | expensive french |
| INFOREQ ZOOMIN | You can get information about restaurants such as the phone number, address or review. For example, to get the phone number circle a restaurant, like this, and say or write phone. | SELECT REST WRITE PHONE | circle restaurant phone |

*FIG. 7B* ⤴ 700

| | | | |
|---|---|---|---|
| INFOREQ ZOOMOUT | You can get a closer look at restaurants by circling the area or the restaurants you're interested in and saying for example, zoom in here, or just writing zoom. | SELECT AREA WRITE ZOOM | circle an area zoom |
| SUBWAY HELP | I can give you subway directions between any 2 points in New York City. For example you could say: how do I get to the cloisters? Alternatively, you could circle where you want to go and write direction or route. | SELECT AREA WRITE SUBWAY | circle an area route |
| SUBWAY DESTINATION | The destination can be a neighborhood, a landmark, cross streets or a point on the map. For example, if want to go to penn station you could just say penn station, or write it on the map. | WRITE POI | penn station |
| SUBWAY SOURCE | The source can be a neighborhood, a landmark, cross streets or a point on the map. For example, if you are at penn station you could just say penn station, or write it on the map. | WRITE POI | penn station |
| SUBWAY ZOOMIN | I can give you subway directions to one of these restaurants. For example, you could say, how do I get to the here, and circle the restaurant. | SELECT REST | circle restaurant |
| MAP HELP | I can help you move around the map. For example, you could say, show chelsea or show penn station or say zoom and circle an area on the map. | SELECT AREA WRITE ZOOM | circle an area zoom |

SYSTEM AND METHOD OF CONTEXT-SENSITIVE HELP FOR MULTI-MODAL DIALOG SYSTEMS

PRIORITY APPLICATION

This application claims priority to U.S. Provisional Application No. 60/394,336 filed Jul. 5, 2002, the contents of which are incorporated herein by reference.

RELATED APPLICATIONS

U.S. patent applications Ser. No. 10/216,390, Ser. No. 10/216,448, Ser. No. 10/216,392, Ser. No. 10/217,112 and Ser. No. 10/217,010, filed Aug. 12, 2002, relate to the present application. U.S. patent application Ser. No. 10/326.629, filed Dec. 19, 2006 relates to the present application. The contents of these applications are incorporated herein by reference. Each of these related applications is assigned to the same assignee as the present application. Application Ser. No. 10/326,629, filed on the same day as the present application and assigned to the assignee of the present application, relates to the present application and its contents are incorporated herein by reference.

BACKGROUND OF THE INVENTION

1. Field of the Invention

The present invention relates to multi-modal systems and more specifically to a system and method of providing context-sensitive help to a user of a multi-modal dialog system.

2. Discussion of Related Art

Figure 1A:
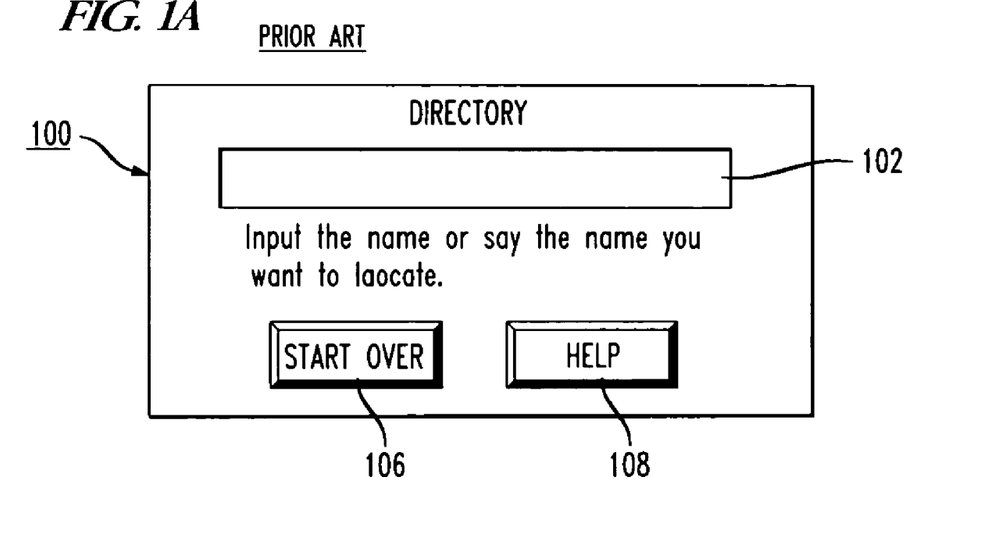
FIG. 1A illustrates a prior art multi-modal screen for a directory application.

Multi-modal dialog systems are becoming more available and popular as technology improves. Examples of such systems include the Multi-Modal Voice Post Query (MVPQ) Kiosk, discussed in S. Narayanan, G. Di Fabbrizio, C. Kamm, J. Hubbell, B. Buntschuh, P. Ruscitti, J. Wright, "Effects of Dialog Initiative and Multi-modal Presentation Strategies on Large Directory Information Access," *ICSLP*, pp. 636, 639, Beijing, China, 2000 ("Kamm et al."), incorporated herein. The MVPQ kiosk allows users to select among a number of different options when they request information about a particular person in a telephone and address directory software application. FIG. 1A illustrates an example opening graphical user interface (GUI) 100 for a MVPQ Kiosk. This GUI 100 enables the user to either type in a name in the field 102 or say the name that the person wishes to look up.

For example, if the user asks for "Kowalski" the system presents either the name and information for the person named Kowalski or, if there is more than one, the different Kowalski's in a list on the display screen 100 and the user can use touch input or mouse control to select the person they want. Other buttons such as a start over button 106 and a help button 108 enable the user to further navigate the site. If in the course of the interaction with the system the user desires to obtain help, he or she can request help by clicking on the help button 108. Typically, this brings up a help menu with various options from which the user can select the topics of interest.

Figure 1B:
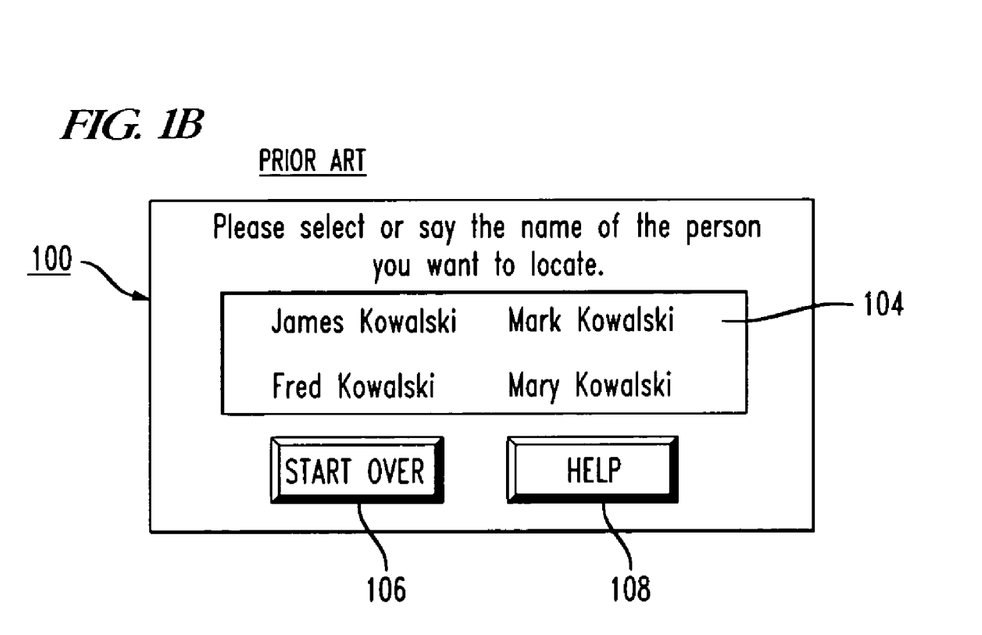
FIG. 1B shows a prior art disambiguation screen when the user requests information using a last name and multiple people in the directory having that last name.

FIG. 1B illustrates the display screen 100 with the information for the user to select from the various people named Kowalski 104. The Kamm et al. system provides some improved interaction in a multi-modal context. The multi-modal disambiguation display 104 shown in FIG. 1B lists the people with the family name Kowalski and asks the user to choose the one that is wanted.

As a user carries on the dialog with the system, it is inevitable that, at some point, the user will desire help with the system. Mechanisms for providing help to the user can be found in some contemporary spoken dialog systems. For example, in the MVPQ system, a help button 108 is available to assist the user with the system. Other buttons such as the start over button 106 are also available as is known.

More help than just a help button may be needed, however. By clicking on such a help button, pre-determined help information may be provided to learn how to use the system or obtain information. The user typically has to learn from the pre-determined help information and then apply that knowledge to the current needs or situation. This is often difficult for users to do and it can be time-consuming.

In multi-modal interactions, users may be taught in advance how to use such a system and the kinds of interactions and combinations of interactions that are available. However, when the time comes to actually use the system, they may forget the multi-modal modes of input and become confused. For example, as people begin to use multi-modal interfaces, they may forget or not understand the various ways in which they can interact with the system. When a person has the option to talk, use electronic ink to write on a touch-sensitive display, or combine these various types of input to make requests, the person may not understand how to fully take advantage of the multi-modal interface. Further, the person may not adapt to situations properly where use of one type of interaction, such as speech, is more difficult. For example, if the user is in a noisy environment, he may not know to move more towards using electronic ink exclusively since the speech component cannot be understood due to the background noise. The result is that the user may continue to reuse or retry speaking to the system unsuccessfully.

SUMMARY OF THE INVENTION

What is needed in the art is an efficient and effective method of providing user help in a multi-modal interactive context. The present invention addresses the deficiencies of the previous work by enabling a help mechanism in a multi-modal system. An object of the present invention is to provide context-sensitive help driven not just by dialog context, but by a combination of dialog context and visual context. A further object is to provide help that is not just spoken or graphical, but that involves multi-modal presentations combining speech with graphics on the display. A further capability of the system according to an aspect of the present invention is to provide situational help—that is, the system uses elements currently on the display as examples for giving help.

These and other objects of the invention are addressed by the disclosure herein. One example application where the context-sensitive help can improve the user's understanding of how to interact with the system is the Multi-Modal Access to City Help or "MATCH." Many of the details of the operation of the MATCH application are found in the incorporated related cases. The MATCH system enables a user to interact multi-modally to obtain help and information about a city. For example, using a portable computing device displaying a map of New York City, a user can, on a touch-sensitive screen, circle an area using a stylus, and say "show me Italian restaurants." The system will respond by showing all Italian restaurants in the circled area. The system can provide information regarding restaurants, tourist sites, directions to any location etc. Since the incorporated related applications above provide many more details regarding MATCH, only this basic introduction to MATCH is provided herein.

The invention comprises systems and methods of providing help during a multi-modal interactive dialog with a user. An embodiment of the invention comprises, in a multi-modal dialog system, a method of presenting a multi-modal help dialog move to a user. The method comprises presenting an audio portion of the multi-modal help dialog move that explains what the user can do in a certain situation, and presenting a corresponding graphical action performed on a user interface associated with the audio portion.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

The present invention provides an efficient and multi-modal means of presenting a user with various kinds of help in the context of a multi-modal dialog. The examples provided herein will relate to the MATCH application for access to city help. However, the present invention may be applied in its general terms to any kind of multi-modal interaction whether it be for medical information, news, scientific uses, video games, Internet use, etc. In all of these contexts and many more, if a multi-modal interface is employed to receive requests from a user and provide information to the user, the user may at some point need help regarding the user's options at that point. The present invention is highly context-sensitive given various points of data regarding any specific context, such as the amount of zoom on a map, what restaurants are shown, how successful the user has been in using the multi-modal capabilities, etc. Based on these and other factors, the system generates a multi-modal help move that uses the current context and graphical information on the screen to teach the user what kinds of information he can request, and how he can request it.

The system is context-dependent by offering help that is tailored to the particular context in which the user asks for or needs help, thus helping the user to integrate the information given with ease. The help system is also multi-modal since it gives auditory explanations accompanied by online examples, such as showing ink on the screen, circling a restaurant, or producing hand-written examples of commands. As many users are not yet familiar with multi-modal systems, it is important to illustrate the number of different ways in which a user can get their point across using speech, gesture and hand-writing. If help is simply given in one mode, such as speech, the user may be tempted just to follow the example and never try out other input modes. This results in a frustrated user and also limits data collection.

Multi-modal interfaces offer users unprecedented flexibility in how they choose to issue requests and give other responses. For example, in the MATCH application, the user can use speech, pen, or multi-modal combinations of the two or more modes to indicate what kinds of restaurants they are interested in, to get subway directions, or to get information (such as a phone number) for a restaurant.

Studies show that users, despite having been given an extensive tutorial on the MATCH capabilities, do not make use of the full range of inputs. When users run into problems with speech recognition, they often fail to switch modes and use pen or multi-modal commands. Given the more passive user-initiative tool-like nature of the system, some users quickly become lost and are not clear on what they can do in a certain scenario. One of the objects of the present invention is to bridge the gap in performance between novice users of multi-modal interfaces and expert users.

The present invention will provide help to a user in two different scenarios: first, when the user requests help; and second, when the system presents unsolicited help to the user based on an analysis of the multi-modal dialog. Regarding the first approach, the system provides preferably three different ways for users to request help. Users can write a help request on the screen using the pen, say a help request such as 'can you help me' or hit a help button in the interface GUI. Further, the user can specify a particular kind of help that they need by writing, for example, 'Restaurant Help' or saying 'Can you help me get subway directions'.

The second way by which the system generates a multi-modal help dialog move is through an analysis of the multi-modal dialog looking for a problematic situation. For example, if background noise prevents the system from understanding spoken input from the user, the system will make a determination regarding whether the user is appropriately switching to another mode for inputting information. U.S. patent application Ser. No. 09/712,194 filed Nov. 15, 2000, and assigned to the assignee of the present invention and incorporated herein, discusses a method of predicting problematic dialog situations in a classification system. Using the principles taught in the incorporated application as well as other known concepts regarding problematic dialogs, the system according to the present invention may trigger a multi-modal help dialog move if the user has demonstrated that he requires assistance. As the user becomes more familiar with the system, the frequency of such unsolicited help moves will decrease.

The problematic situations may relate to recognition errors, a low threshold indication from the speech recognizer or gesture recognizer, and multiple inputs by the user of the same thing. For example, the system may track the number of times the user requests directions or the number of times the system responds with: "I'm sorry I didn't quite get that." This will often be the result of receiving a plurality of utterances from the user wherein a recognition threshold is not met. As an example, if the recognition confidence score for speech recognition is below a recognition threshold value of 50% for more than three utterances in a row, then the system may respond with a problematic situation help dialog. Other thresholds and number of unrecognized utterances or poorly recognized utterances of course are possible, depending on system requirements and programming desires. The number of the plurality of user utterances (or combinations of multi modal input including a null input) that trigger a dialog help move may be set by programmers or adjustable according to automatic speech recognition performance or other parameters, as well as user experience. Further, the problematic situation may be a combination of one or more unrecognized utterances with an unrecognized gesture or gestures. Thus, in the multi-modal context, there are many ways and combinations of unrecognized input that may trigger a help dialog move. These different possibilities share the property of using cues to identify when a dialog is not going well and then intervening to help the user.

The system may receive a null input and respond accordingly. The parameters associated with how long to wait or the number of problematic inputs to receive before the system initiates a help move may be determined by system developers and may change with the automatic speech recognition module, the gesture recognition module, or the user experience. Further, the system may provide an adjustment capability wherein the user can select or adjust the threshold levels related to help moves triggered by problematic situations. In this manner, impatient or more patient users can tailor the multi-modal experience to their liking.

Figure 2:
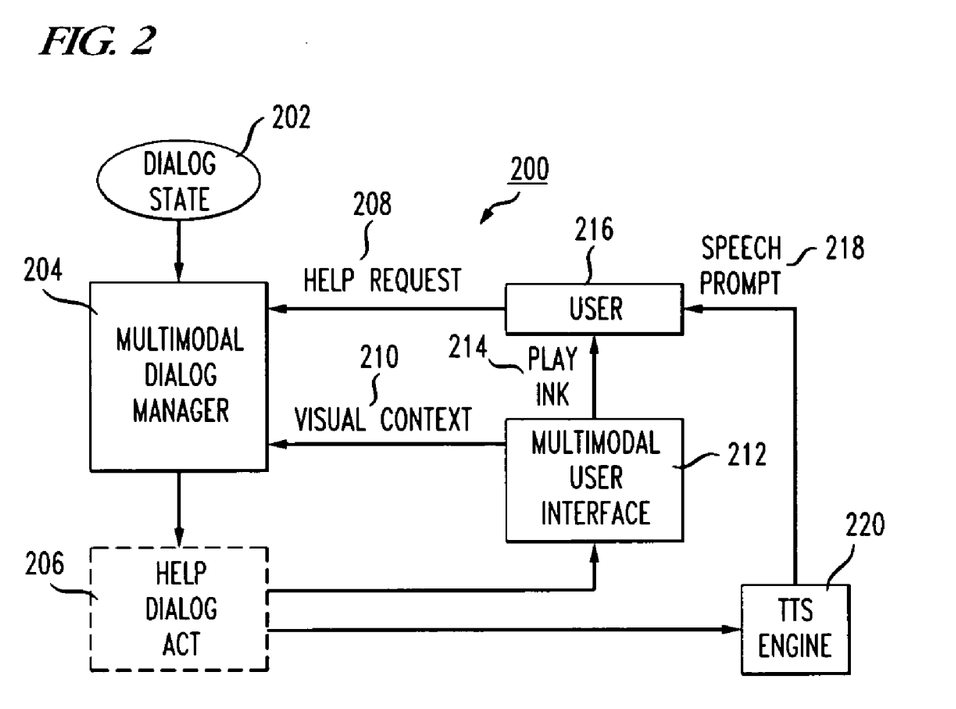
FIG. 2 illustrates in block diagram form the information flow for a multi-modal help system according to the present invention.

FIG. 2 illustrates an exemplary flow of information in a multi-modal help system according to an aspect of the present invention. In this example, the user 216 requests the help. The user request for help 208 is sent to the multi-modal dialog manager (MDM) 204. The dialog manager 204 determines the system's next move using a set of help rules that are triggered by the request for help. The MDM 204 is a speech-act based dialog system. Each utterance is classified as a dialog move that updates a common information state. The decision of which dialog moves to be performed by the system are made by the dialog move engine. The MDM 204 comprises three specification files: an information state; resources and modules; and a control algorithm.

The information state contains a list of variable/binding pairs for different aspects of the dialog, such as the history list, user/system's intentions etc. The variables are defined prior to dialog initiation but the bindings can be changed throughout the course of the dialog. Resources are structured sources of information, such as the Ontology resource that defines structures such as the types of dialog moves or the frame slots for command completion. Modules are groups of processes that perform similar functions. Resources and modules may be internal to the MDM 204 and therefore have complete access to the information state; or they can be external, communicated to by passing messages, and have limited access to the information state variables. A control algorithm that calls one or more modules or resources operates the information state. The top-level dialog flow controller has the following structure: it interprets the user's utterance; updates the information state; and selects the appropriate response and generates text for TTS.

There are certain aspects of this dialog manager that are specialized for multi-modal applications. For example, the information state contains variables pertaining to the state of the visible map (such as zoom level, number of entities showing) that are updated via a message every time the map changes. The system is user-initiated, allowing the user to switch topics/commands freely. The system does take the initiative when a command cannot be completed due to missing information; however, the user is free to start over with a new command.

These rules are sensitive to both the current dialog state 202 (which the dialog manager updates each turn) and the visual context 210 of the interface. For example, the visual context may be a map at a certain zoom level and a grouping of three restaurants. The multi-modal user interface 212 sends an update indicating the current zoom level of the map, which portion of the map is showing and which restaurants are showing. For example, if the dialog state indicates that the user has just successfully managed to show a set of restaurants on the map and the visual context indicates that the zoom level is sufficiently low that individual restaurants are visible, then the system will provide a multi-modal presentation explaining how to get information about a restaurant.

The multi-modal help presentation is an example of a multi-modal help dialog move. The multi-modal help dialog move comprises the combinations of speech, ink, graphics, or other modes of presenting help-related information to the user in the given context. FIG. 2 illustrates the multi-modal help dialog move as a help dialog act 206 generated by the dialog manager 204. The multi-modal help dialog move 206 comprises several components: (1) a text-to-speech prompt 218 generated by a text-to-speech engine 220, such as the AT&T Natural Voices TTS engine, explaining what the user can do in the current situation and graphical action; and (2) drawing ink 214 on the user interface map 212.

Figure 3:
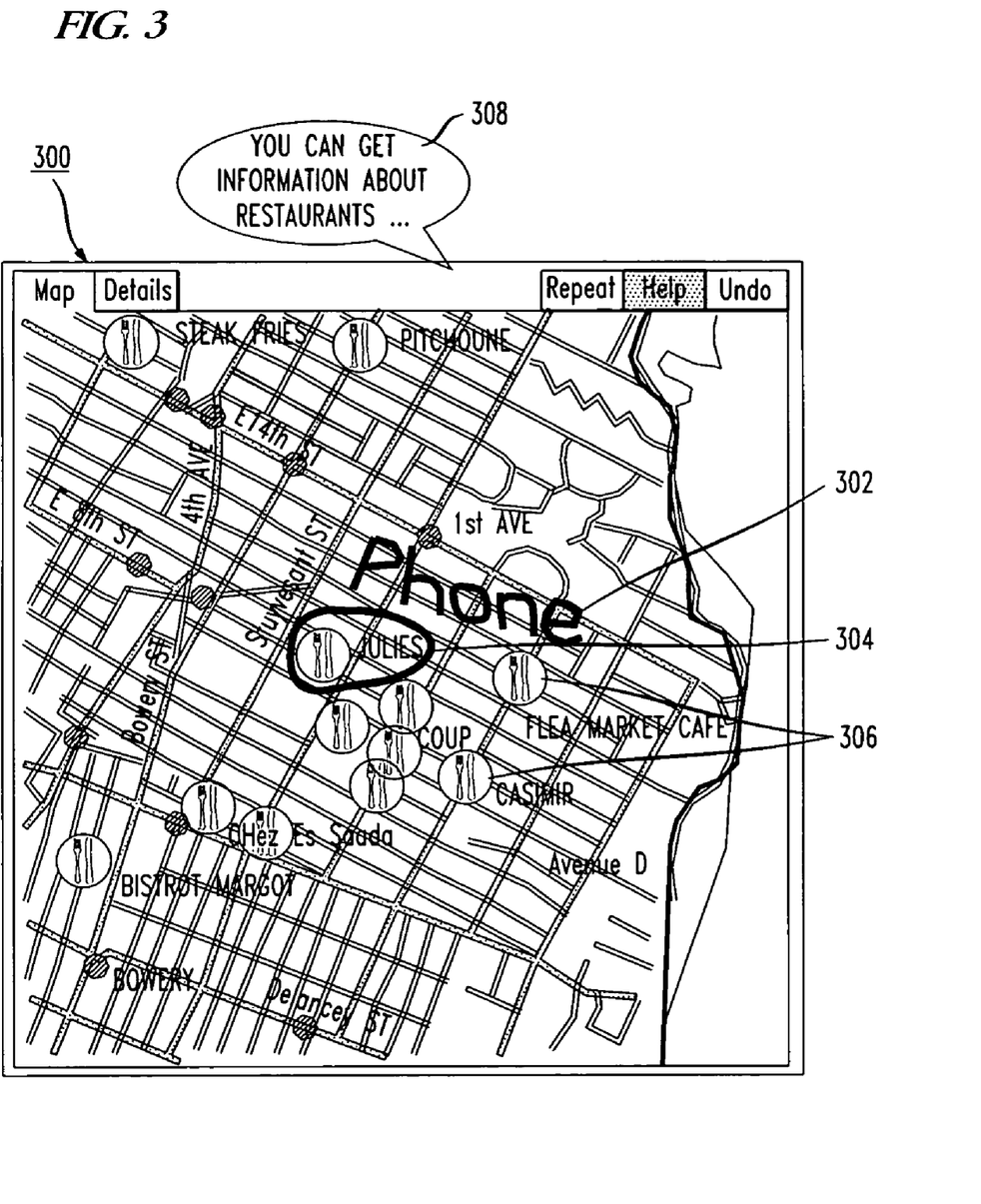
FIG. 3 illustrates an example of ink on the user interface associated with the multi-modal help move.

Therefore, in response to the user request for help 208, the user 216 receives a presentation combining ink drawn on the display and synthesized speech. FIG. 3 illustrates how the multi-modal dialog help move may be presented. In this MATCH example, the system would say "You can get information about restaurants such as the phone number, address, or review. For example, to get the phone number circle a restaurant and say or write phone" 308. As the system says the words 'circle a restaurant' and 'write phone', the system draws an area on the display around a restaurant 304 and then writes the word 'phone' 302 next to it. One of the advantages of providing the multi modal dialog help move is that it is context-sensitive to the present needs and the experience of the user with the multi-modal system. The multi-modal dialog help move uses whatever is currently on the display to give an example to the user, just as another person might if they were helping someone to learn to use the system. This is considerably less confusing and obtrusive than switching the user to a different screen with samples of different commands. Further, the user learns more quickly how to navigate the system because the user is not burdened with navigating a menu system to seek the help information needed.

Figure 4:
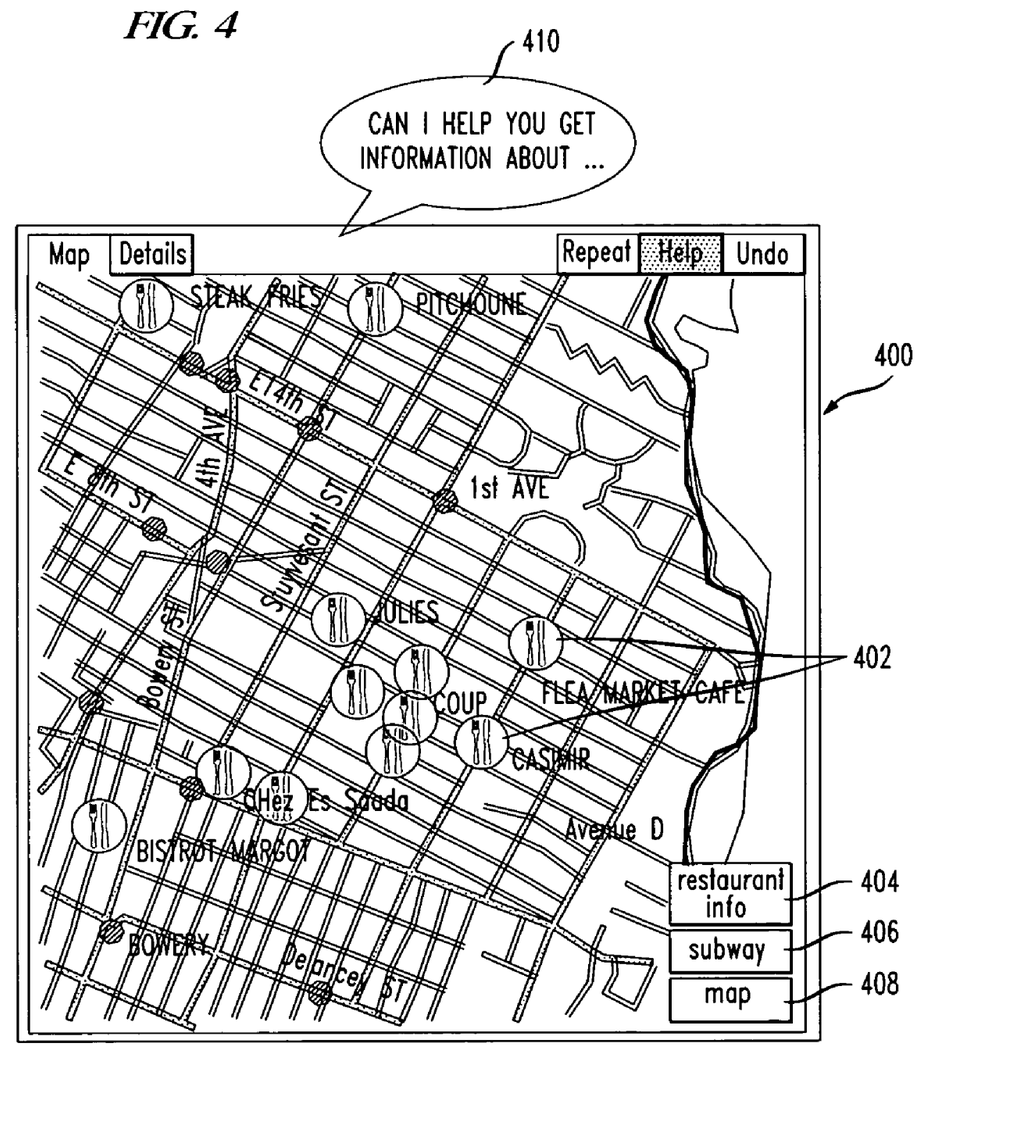
FIG. 4 illustrates triage widgets associated with a help move.

It is often the case that, in a given dialog context and visual context, there are several different kinds of help that can be given. FIG. 4 illustrates a variation on the multi-modal help dialog move. In the example situation above where restaurants 402 have been shown and they are clearly visible on the display, in addition to restaurant information the user can also ask for directions to a restaurant. To handle these cases, the present invention employs a triage help dialog move. The triage help dialog move comprises a TTS prompt 410, for example "I can help you get information about restaurants, get subway directions, or move around the map. Which one would you like to know about: restaurant information, subway or map." While providing the TTS prompt, the system presents a graphical action related to the triage move. The graphical action is preferably a set of buttons in the bottom right of the display 404, 406, 408. These buttons are temporarily placed in a non-obtrusive location on the display screen 400 and show up at the appropriate time during the dialog context when the user needs to make a choice. The triage buttons enable a more efficient and quick response from the user. Instead of requiring the user to say "restaurant information," the triage buttons 404, 406, 408 enable the user to just click on the options desired. After the user makes a selection either by clicking on a button or using some other multi-modal input method, the triage buttons go away. Therefore, the triage buttons 404, 406, and 408 enable the user to indicate which kind of help they need with a single unambiguous tap on the display. Further, the triage buttons 404, 406 and 408 can simply identify the options available to the user in any given context. Thus, if the user does not know what options he can choose, the triage buttons 404, 406 and 408 and the like not only provide a way to select options, but an identification method of available options. For more information on triage buttons (or triage widgets), see Ser. Nos. 10/325,292 and 10/325,296, each incorporated herein by reference and assigned to the assignee of the present application.

The multi-modal help dialog move may also incorporate the presentation of text that may or may not accompany synthetic speech. For example, a help dialog move may comprise a presentation of textual instructions and accompanying graphical presentations to present the help to the user. Further, the text may follow the synthetic speech such that the help move includes a text presentation, audio presentation and coordinated graphical presentation. These various combinations enable the help move to be presented in various environments. For example, when in a noisy environment, the system may either detect the situation or engage in an interaction with the user to add the textual component of the multi-modal presentation such that the user can read the text if the speech cannot be heard.

Since a potential multi-modal presentation coordinates speech and graphical illustrations on a GUI, when text is added to the presentation, further features of the text such as a bouncing ball, or highlighting the text or word as the TTS module presents the synthetic speech. In this regard, by synchronizing the presentation of the text with the synthetic speech and/or a graphical presentation, a text-related graphical component in addition to the text enhances and focuses the user's attention in the coordinated multi-modal presentation.

Figure 5:
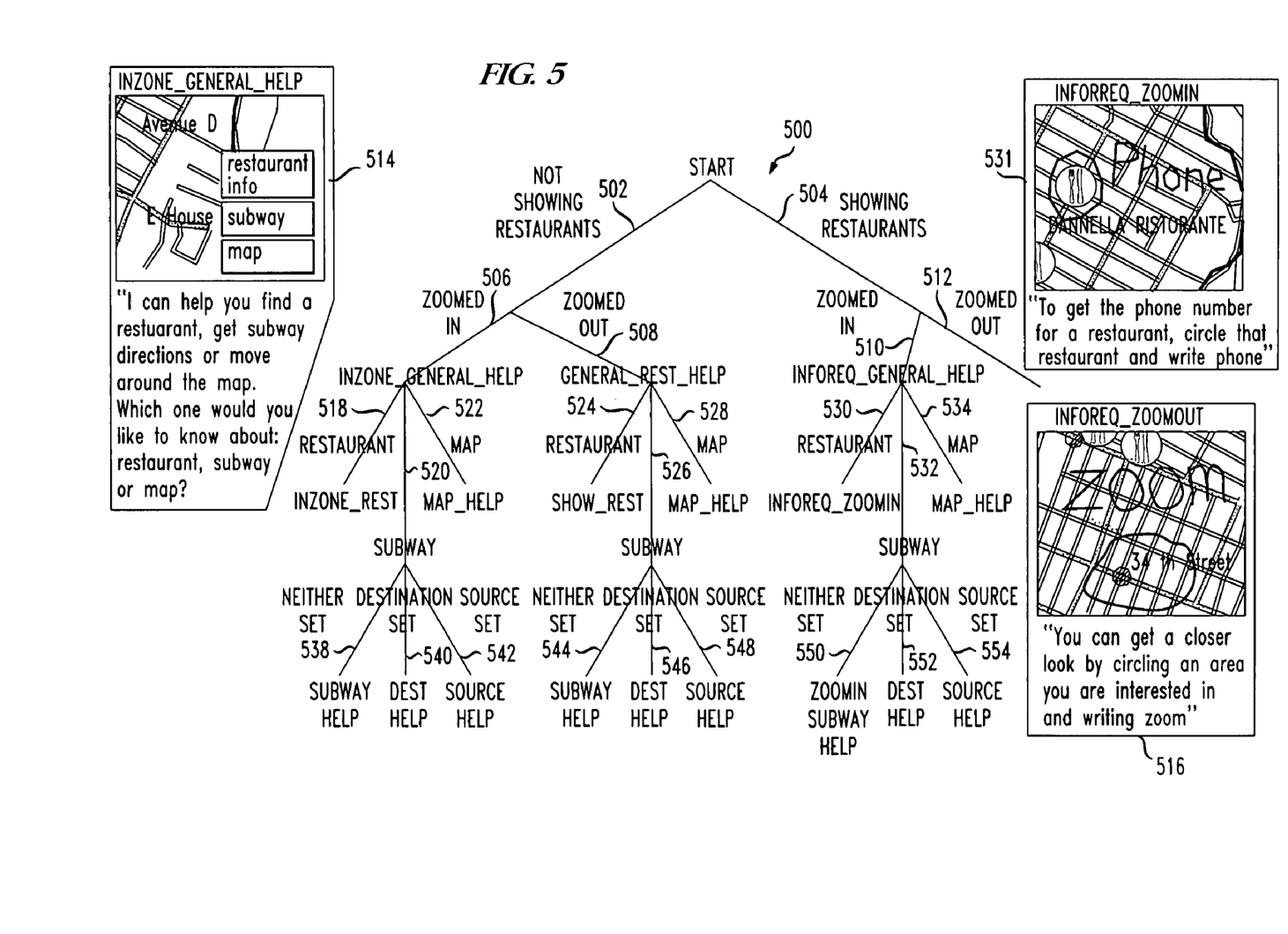
FIG. 5 illustrates a multi-modal context-sensitive help decision graph.

FIG. 5 illustrates details of the context-sensitive decision process 500 used to determine which kinds of help dialog moves to give. This example is given in the context of providing help information related to restaurants but, as mentioned above, this process can be applied in any context. A shallow approach is adopted for the help dialog move (HDM) scheme, meaning that access to the help module of the dialog manager should only occupy two turns at most. A set of help dialog moves is divided into queries and exemplary declaratives. If the user does not specify which type of help they are interested in, the dialog manager uses one of the query help dialog moves: query_help, inzone_query_help or inforeq_query_help. Examples of these moves, exemplary commentary from the system, and help actions are provided in FIGS. 7A and 7B. It is clear from the example dialog in FIG. 7A that a query help dialog move relates to providing the user with information regarding what kinds of queries the user can make—such as location of a restaurant, directions, etc. For the MATCH application, these kinds of things are necessary for the user to navigate the system. In other contexts not related to MATCH, the query_help dialog move may relate to basic kinds of queries a user can make, such as how to make a purchase if it is a financial transaction context. The user may ask for specific help, such as "how do I get subway directions?" This kind of question requests a specific kind of help that they are interested in. In response, the system will execute a HDM that teaches the user, in a context-sensitive environment, how to obtain subway directions.

The inzone_query HDM informs the user regarding the kind of information the user can obtain "in" a "zone" such as "I can help you find a restaurant in this area . . . " The inforeq_query relates to a query HDM that informs the user regarding the kinds of information the user can obtain about a restaurant. Help actions for the above HDMs may be triage buttons or other associated help action.

Returning to FIG. 5, the decision process 500 branches in two directions: first, where the display does not show restaurants 502 and second when the display shows restaurants 504. The purpose of the context-dependent decision making process is to minimize the diversion of the user away from their goal. This is achieved by application of a set of HDM rules in the help module of the MDM. These rules are triggered by current context as represented in the information state. The decision branches shown in FIG. 5 are triggered by the visual context and dialog history.

Typically, the visual context relates to the zoom level on the map and the number of entities (such as restaurants) showing on the map. These attributes are stored in the information state and updated in accordance with messages from the user interface that are sent when the map display changes. The zoom level is important, as one can ask MATCH to show entities at any zoom level on the map—for example: "show Italian restaurants in Manhattan." It is very difficult to circle entities and get information about specific restaurants at a high zoom level, since entities appear as clusters of small dots. Therefore, it is important to steer the user to a lower zoom level if they ask for help in this context. Following the right-hand side of FIG. 5, note that the HDM inforeq_zoomout 512, 516 is called up in this scenario. Inforeq_zoomout 516 gives a relevant prompt and graphical action, where the user is directed to circle an area and write or say 'zoom.' Once the user is at this lower zoom level, he can easily select the restaurant he wants information about or directions to.

If the user is zoomed in and restaurants are showing, then it is important to give help related to those restaurants on the screen. The inforeq_zoomin HDM 531 takes a restaurant on the screen as an example and shows the user how to get details about that restaurant. Feature 531 shows the prompt and associated action whereby a restaurant is circled and "phone" is written on the screen. Similarly, subway_zoomin_help called in the same context takes an entity on the screen and uses that in its example of how one can get subway directions to or from that point.

The dialog context comes into play when the system needs to examine how much information the user has already established so as not to repeat an instruction that the user has already performed. For example, when giving instructions on getting subway directions, the system looks up in the dialog history to see if the source of a route has been given (e.g., the user's location). If this is the case, then the system helps the user establish a destination (e.g., one of the restaurants on the screen) by executing the destination help dialog help move.

Next we describe the decision tree and various HDMs that may be executed to provide context-sensitive help to a user. The branch "not showing restaurants" 502 provide the context of no restaurants on the screen. The next step may involve determining the level of zoom, i.e., whether the image is zoomed in 506 or zoomed out 508. If the image is zoomed in, the help move inzone_general_help may be triggered and the system says to the user: "I can help you find a restaurant in this area, get subway directions, or move around the map" 514. As shown in feature 514, the inzone general_help HDM may include triage widgets (restaurant info, subway help, and map widgets) positioned in a corner of the viewing screen or other location. In this manner, the system makes a determination that the level of zoom has passed a certain threshold such that the user is more likely to need the given information in the help move. Therefore, in the context of the entire multi-modal dialog, the user, if looking for restaurants, has made it through much of the dialog already and now needs to be informed regarding the finer details available at this "in-zone" level. Assuming that the image is zoomed in 506 and no restaurants are shown 502, the user may request information regarding restaurants 518 triggering the HDM inzone_rest. Other information requested may include subways 520 triggering the subway help and map help 522 from the map_help HDM. Assuming the user asks for restaurant information, the next dialog help move may say something like: "I can give you information on restaurants in this area based on price and food type" 536. If the user desires subway help, further dialog moves may provide subway help 538 from the subway_help HDM, destination help 540 from the dest_help HDM or source help 542 from the source_help HDM. The source_help HDM helps a user indicate a starting point for a route. For example, if the user just asked for directions to a restaurant, the system will need to know the starting point for the directions. This information may be obtained from a location-based system such as GPS as would be known in the art, or the source_help HDM can request a starting point (or source) from the user.

In this manner, once the user has zoomed into a certain area on the map, the help dialog moves assist the user in obtaining information regarding how to find restaurants and select restaurants based on the available criteria such as price and food type. An advantage of this help service is that the user does not need to know exactly what types of information are available at any certain stage of the dialog; the context-sensitive dialog help information gives the user his available options.

If the image is zoomed out 508, then a general restaurant help move (general_rest_help) may be provided that includes information regarding restaurants 524, subways 526 and maps 528. This help move will differ from the help move given when the image is zoomed in and will be more general. This HDM will also urge the user to focus or zoom in on the display to narrow the context and improve the interaction. If the user selects subway information 526, then the dialog move may inform the user that subway help 544 (subway_help), destination help 548 (dest_help) or source help 548 (source_help) are available for more information.

The other branch of the process relates to the scenario when the display screen is showing restaurants 504. If the image is zoomed out 512, the dialog help may be "you can get a closer look by circling the area for the restaurant you are interested in" 516 (inforeq_zoomout). As always, this help dialog move may be multi-modal and include exemplary ink on the display screen to show the user how to circle a potentially desirable area.

If the image is zoomed in 510, the system may present a more general information request help dialog move (inforeq_ general_help) that includes information for restaurants 530 (inforeq_zoomin), subways 532 and map help 534 (map_help). For example, the map help comprises the following TTS phrase: "I can help you move around the map. E.g., you could say 'zoom' and circle an area on the map." If the user requests subway information 532, the system could provide a further help dialog to assist the user in learning how to obtain zoomed in subway help 550 (zoomin_subway_help), destination help 552 (dest_help) and source help 554 (source_help).

Figure 6:
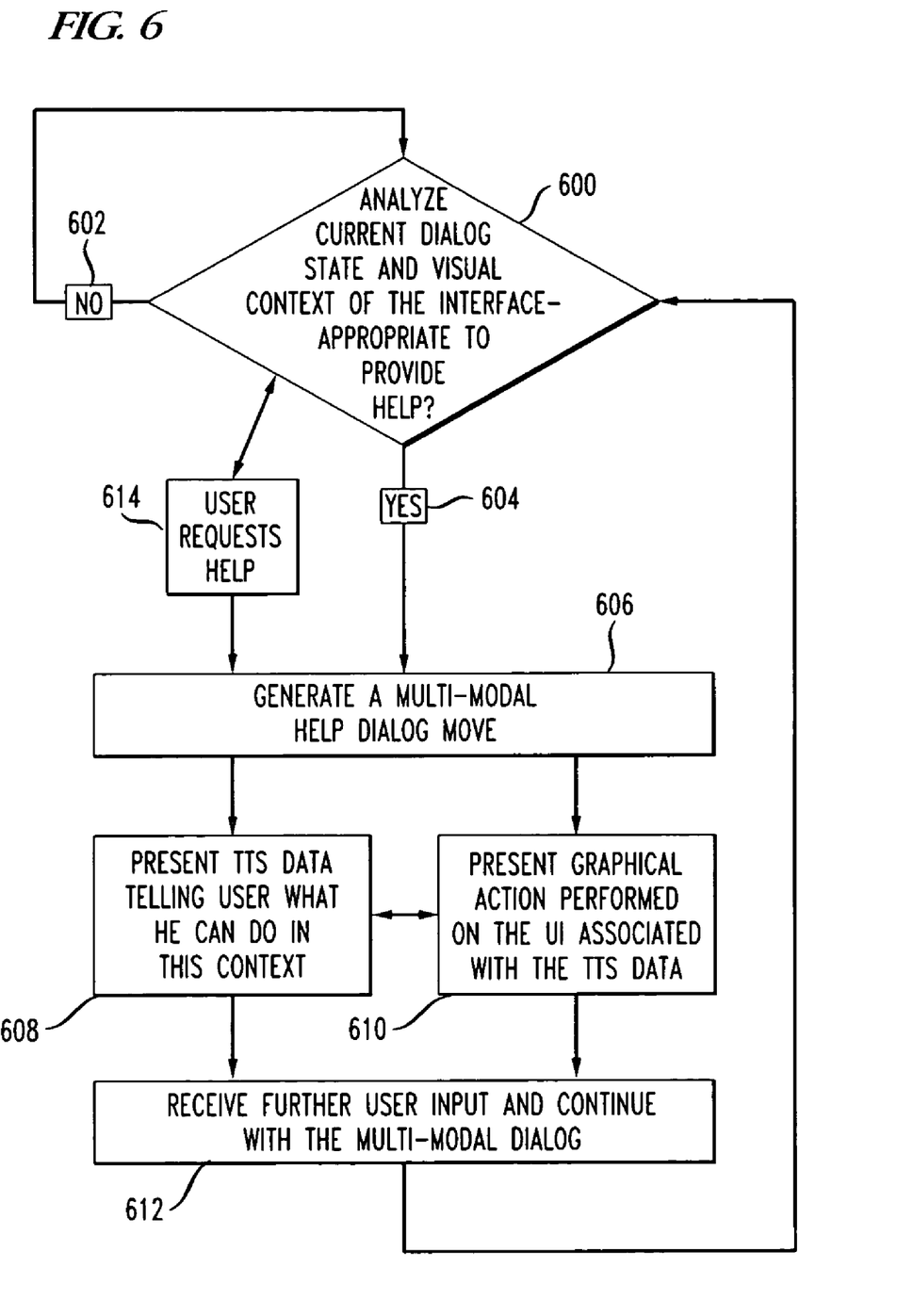
FIG. 6 illustrates a process for providing a multi-modal context-sensitive help move.

FIG. 6 illustrates a method according to an aspect of the present invention. First, the system analyzes the current dialog state and the visual context of the interface 600. The system may determine if it is appropriate to trigger a multi-modal help move. If no 602, it is not appropriate to present an automatically triggered help move, and the system continues to analyze the dialog state 600. If yes 604, it is appropriate to automatically present a help dialog move; or if the user requests help 614, then the system uses the context information and current state to generate the multi-modal help dialog move 606 as described above. Two exemplary portions of the dialog move comprise TTS synthetic speech 608 accompanied by a graphical action 610 that may include triage widgets or ink on the display related to moves the user can initiate to obtain further information. Next, the system receives the further user input to continue with the multi modal dialog 612.

As described in the introduction, it is desirable that user understand all the capabilities of the system, in particular the types of modes of input available—namely, speech, pen and hand-writing. By using all three of these modes in the help system, the system avoids priming the user into using only one mode. Combining auditory and pictorial information lightens the working memory resources over tutorials where the auditory information is presented as text, forcing the learner to switch between text and picture in order to integrate them mentally.

The MATCH architecture provides capabilities for multi-modal output generation. The multi-modal UI is capable of various graphical actions, including dynamically replaying words and gestures on the map and using ink to highlight specific entities. In addition, the UI has functionality to examine the current set of displayed restaurants and select one that is close to the center of screen and does not have other restaurants close by. This restaurant is used to illustrate to the user how they can circle around a restaurant in order to select it. The AT&T Natural Voices TTS engine is integrated into the architecture and TTS prompts can be temporally synchronized with graphical actions in the UT.

Figure 7A:
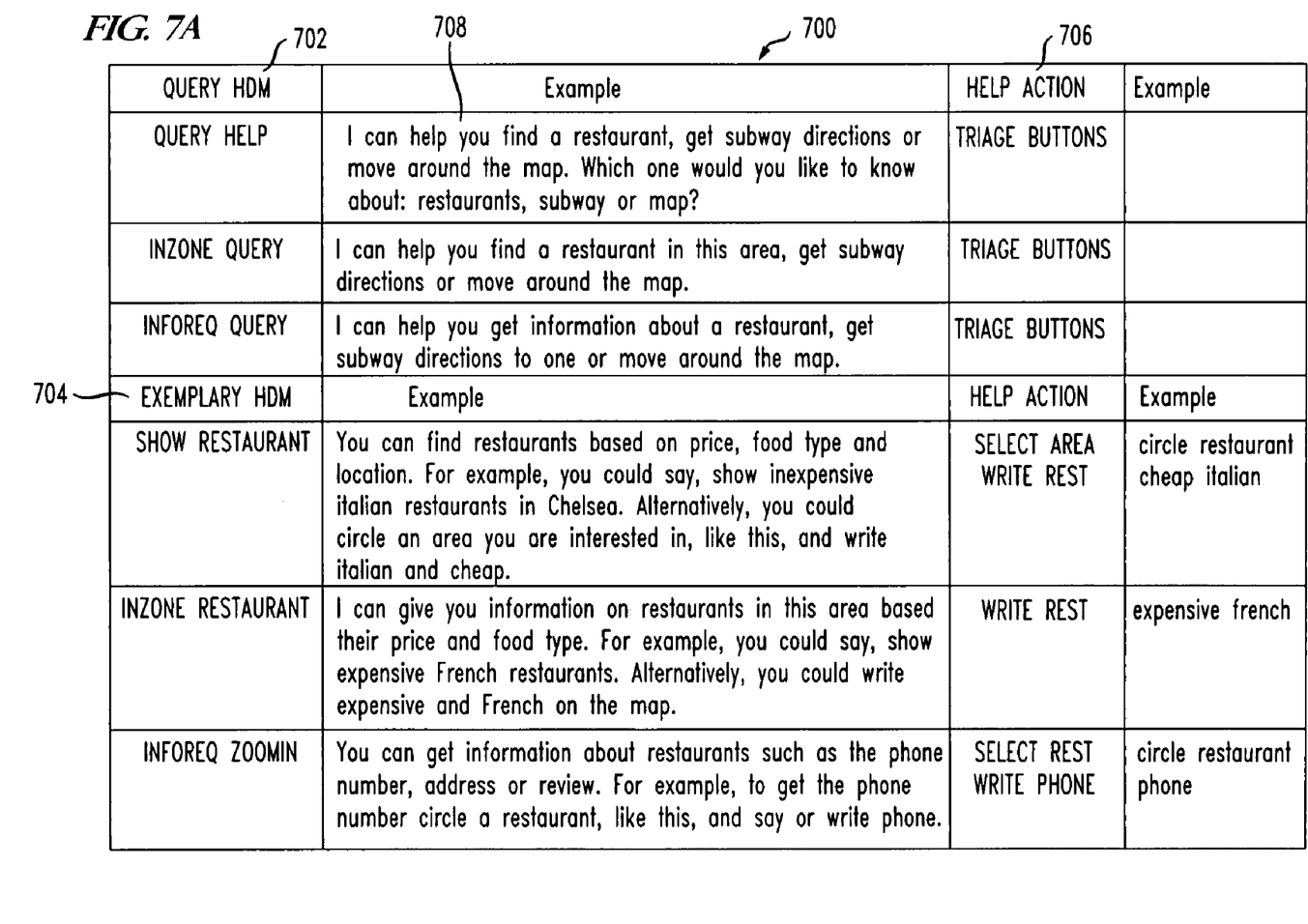
FIGS. 7A and 7B illustrate tables of example help dialog moves and example audio instructions and other graphical help actions.
Figure 7B:
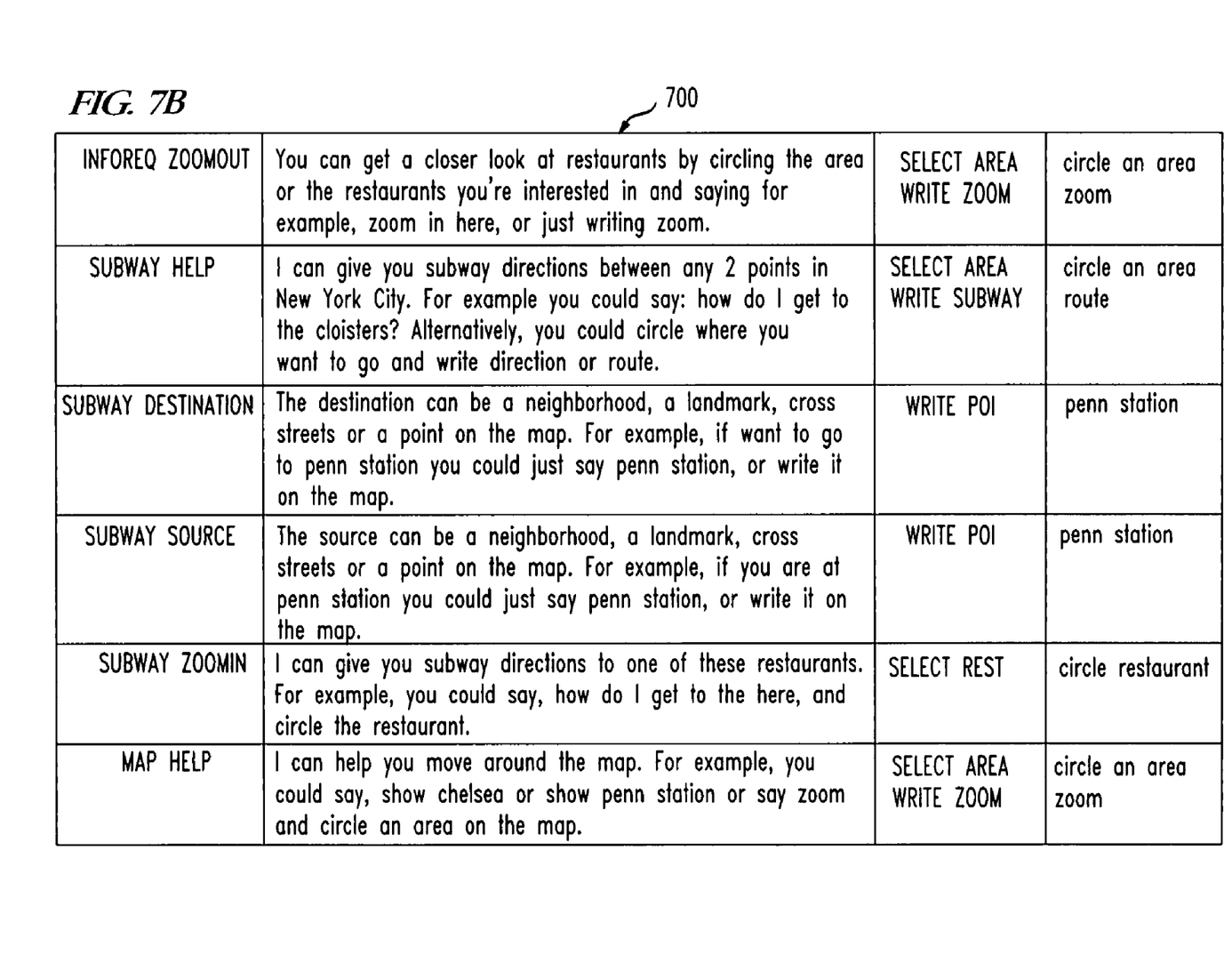

Each of the HDMs has an associated graphical action or set of actions as shown in FIG. 7A. The query HDMs are associated with triage widgets. The declarative (exemplary) HDMs are associated with actions involving drawing gestures and words on the display. Examples of words and gestures associated with actions are given in FIG. 7B. One such example is shown FIG. 5, where feature 531 that illustrates the inforeq_zoomin HDM is combined with select_rest and write_rest help actions, thus forming a multi-modal help dialog move (MHDM).

The triage widgets help to constrain the help offered based on the context in a system where complex and multiple kinds of help would be relevant. For example, if the user has just successfully viewed restaurants and is at a sufficiently low zoom level, the system could either help the user with information about restaurants or help with subway directions to one of them. In this case, the MDM takes initiative with a query_help dialog move and asks the user which kind of help they would like (e.g., inforeq_query): "I can help you get information about a restaurant, get subway directions to one or move around the map. Which one would you like to know about: restaurant information, subway or map?" The user is free to respond using speech or pen, but the system also provides a triage widget (or a list of buttons) in the bottom right-hand side of the display or elsewhere which allows the user to make their choice using a single unambiguous pen tap (feature 514 of FIG. 5). This widget is only available for that single turn and disappears afterwards. It does not clutter the display and appears only in the specific contexts where it is maximally useful. Buttons offer the user an error-free method of communicating with the system, particularly useful if poor ASR performance is contributing to the user's need for help.

Synchronization between the spoken portion of a MHDM and the graphical actions is coordinated by the multi-modal UI. Multi-modal help requests consist of a prompt along with a series of specified graphical actions. The UI builds a stack of the graphical actions and sends the prompt to the TTS agent to be realized as synthetic speech. The prompt contains bookmarks that are returned by the TTS agent as those sections of the prompt are rendered. When these bookmarks are received, the UI pops off the next action from the stack and executes it. For this task, the speech and gesture are synchronized effectively by placing the bookmarks a word or so back from the associated spoken phrase:

```
<mhdm><speech> You can get information about restaurants such as the
phone number, address or review. For example, to get the phone number
<bmk>1</bmk> circle a restaurant and say or <bmk>2</
bmk> write phone.
</speech><actions><action><id>1</id> <spec>SELECT REST</spec></
action><action><id>1</id><spec>WRITE_PHONE</spec></action></
actions></mhdm>
```

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments of the invention are part of the scope of this invention. For example, any multi-modal communication between a person and a computing device can utilize the principles of the present invention. Any exchange of information is contemplated as being capable of using these principles beyond the MATCH application. Accordingly, the appended claims and their legal equivalents only should define the invention, rather than any specific examples given.

We claim:

1. In a multi-modal dialog system, a method of presenting a multi-modal help dialog move to a user, comprising:

analyzing a current dialog state with the user, including a visual context, to determine whether presenting a multi-modal help dialog move to the user is appropriate;

if the multi-modal dialog system determines that it is appropriate to present a multi-modal help dialog move:

presenting the multi-modal help dialog move having an audio portion and a graphical portion that utilize the visual context of the current dialog state with the user.

2. The method of claim 1, further comprising:
if the multi-modal dialog system determines that it is not appropriate to present a multi-modal help dialog move:
waiting for a user request to present a multi-modal help dialog move.

3. The method of claim 1, wherein the presented graphical portion further comprises at least one graphical button corresponding to available choices to the user.

4. The method of claim 3, where the at least one graphical button relates to different kinds of help available to the user.

5. In a multi-modal dialog system, a method of presenting a multi-modal help dialog move to a user, comprising:
upon a user request or triggered by a problematic dialog situation detector, presenting the multi-modal help dialog move having an audio portion and a graphical portion that utilize a visual context of the current dialog state with the user, wherein the multi-modal help dialog move provides information to the user regarding how to interact with the system in a multi-modal fashion.

6. The method of claim 5, wherein the presented graphical portion further comprises at least one graphical button corresponding to available choices to the user.

7. The method of claim 6, where the at least one graphical button relates to different kinds of help available to the user.

8. In a multi-modal dialog system using a map display having an entity of interest thereon, a method of presenting a multi-modal help dialog move to a user, comprising:
when an entity of interest is currently being displayed to the user:
presenting a multi-modal help dialog move having an audio portion and a graphical portion, the audio portion stating a plurality of types of information available to the user associated with the entity of interest, and the graphical portion corresponding to the audio portion.

9. The method of claim 8, where the audio portion further comprises instructions to the user regarding how to multi-modally obtain information regarding the entity of interest.

10. The method of claim 9, wherein while the audio portion is being presented to the user explaining how to multi-modally obtain information regarding the entity of interest, the graphical portion provides an example graphical input that the user can make to obtain the information about the entity of interest.

11. A method of assisting a user to interact with a system having a multi-modal interface, the method comprising:
analyzing a multi-modal dialog for problematic situations; and
upon determining that help is needed, presenting to the user a multi-modal dialog help move having an audio portion and a graphical portion, the multi-modal help move audibly explaining the user available multi-modal actions the user can take to obtain information while providing corresponding graphics demonstrating the kind of graphic input the user can make to obtain the information.

12. The method of claim 11, wherein the system comprises a problematic dialog situation detector to detect problematic situations.

13. The method of claim 11, wherein the presented multi-modal dialog help move utilizes current graphical information being presented to the user in demonstrating the kind of graphic input the user can make to obtain the information.

14. In a multi-modal dialog system using a map display having a plurality of entities of interest thereon, a method of presenting a multi-modal help dialog move to a user, comprising:
selecting an entity of interest from the plurality of entities of interest currently displayed to the user; and
presenting a multi-modal help dialog move having an audio portion and a graphical portion, the audio portion stating a plurality of types of information available to the user associated with the selected entity of interest, and the graphical portion being associated with the audio portion.

15. A computing device that provide a multi-modal interface for a user, the computing device comprising:
a module configured to analyze a current dialog state with the user, including a visual context, to determine whether presenting a multi-modal help dialog move to the user is appropriate; and
a module configured to present a multi-modal dialog move having an audio potion and a graphical portion that utilize the visual context of the current dialog state with the user if the module configured to analyze the current dialog state determines it is appropriate.

16. The computing device of claim 15, further comprising:
a module configured to wait for a user request to present a multi-modal help dialog move if module configured to analyze the current dialog state determines that it is not appropriate to present a multi-modal dialog move.

17. The computing device of claim 15, wherein the presented graphical portion further comprises at least one graphical button corresponding to available choices to the user.

18. The computing device of claim 17, wherein the at least one graphical button relates to different kinds of help available to the user.

19. A computing device having a multi-modal interface, the computing device comprising:
module configured to analyze a multi-modal dialog for problematic situations and
a module configured, upon determining that help is needed, to present the user a multi-modal dialog help move having an audio portion and a graphical portion, the multi-modal dialog help move audibly explaining the user available multi-modal actions the user can take to obtain information while providing corresponding graphics demonstrating the kind of graphic input the user can make to obtain the information.

20. The computing device of claim 19, wherein the computing device further comprises a problematic dialog situation detector to detect problematic situations.

21. The computing device of claim 19, wherein the presented multi-modal dialog help move utilizes current graphical information being presented to the user in demonstrating the kind of graphic input the user can make to obtain the information.

* * * * *